US010106453B2

(12) United States Patent
Schenk et al.

(10) Patent No.: US 10,106,453 B2
(45) Date of Patent: Oct. 23, 2018

(54) METHOD FOR PRODUCING A COMPOSITE BODY OF A MATERIAL WITH A HIGH SILICIC ACID CONTENT

(71) Applicant: Heraeus Quarzglas GmbH & Co. KG, Hanau (DE)

(72) Inventors: Christian Schenk, Ingelheim (DE); Frank Wessely, Dieburg (DE); Gerrit Scheich, Seligenstadt (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 164 days.

(21) Appl. No.: 15/358,287

(22) Filed: Nov. 22, 2016

(65) Prior Publication Data

US 2017/0144916 A1 May 25, 2017

(30) Foreign Application Priority Data

Nov. 25, 2015 (EP) .................................... 15196193

(51) Int. Cl.
*C03C 3/06* (2006.01)
*C03B 19/06* (2006.01)
(Continued)

(52) U.S. Cl.
CPC ................ *C03C 3/06* (2013.01); *B05D 3/007* (2013.01); *B05D 7/50* (2013.01); *C03B 19/066* (2013.01);
(Continued)

(58) Field of Classification Search
CPC ....... C03C 3/06; C03C 4/082; C03C 2203/20; C03B 19/066
See application file for complete search history.

(56) References Cited

U.S. PATENT DOCUMENTS 6,484,540 B1 * 11/2002 Shimada ............... C03B 23/207
65/36
2006/0046075 A1 * 3/2006 Maul ...................... C03B 19/06
428/432
(Continued)

FOREIGN PATENT DOCUMENTS

DE        10344189 A1    2/2005
DE     102004052312 A1    3/2006
(Continued)

OTHER PUBLICATIONS

Search Report dated Jun. 1, 2016 in EP Patent Application No. 15196193.5.

*Primary Examiner* — Erin Snelting
(74) *Attorney, Agent, or Firm* — Panitch Schwarze Belisario & Nadel LLP

(57) ABSTRACT

A low cost method for producing a mechanically and thermally stable composite body containing a first layer of a material with a high silicic acid content and an additional component connected to a second layer of a material with a high silicic acid content and an additional component in a second concentration differing from the first concentration is provided. The method involves (a) preparing a first slurry layer having a free surface using a first shirt mass containing $SiO_2$ particles and an additional component dispersed in a first dispersing agent, (b) providing a second slurry mass containing $SiO_2$ particles and an additional component in a second concentration dispersed in a second dispersing agent, (c) forming a composite-body intermediate product by applying the second slurry mass to the free surface of the first slurry layer, and (d) heating the composite-body intermediate product while forming the composite body.

13 Claims, 2 Drawing Sheets

(51) Int. Cl.
*C03C 4/08* (2006.01)
*B05D 3/00* (2006.01)
*B05D 7/00* (2006.01)
*C03C 14/00* (2006.01)

(52) U.S. Cl.
CPC ............ *C03C 4/082* (2013.01); *C03C 14/004* (2013.01); *C03B 2201/20* (2013.01); *C03B 2201/30* (2013.01); *C03B 2201/58* (2013.01); *C03C 2201/26* (2013.01); *C03C 2201/30* (2013.01); *C03C 2203/22* (2013.01); *C03C 2214/30* (2013.01)

(56) References Cited

U.S. PATENT DOCUMENTS

| | | | | |
|---|---|---|---|---|
| 2008/0075949 | A1* | 3/2008 | Kirst | C03C 17/02 428/332 |
| 2009/0098370 | A1* | 4/2009 | Sato | C03B 19/1453 428/333 |
| 2010/0115996 | A1* | 5/2010 | Werdecker | C03B 19/06 65/33.4 |
| 2012/0237685 | A1* | 9/2012 | Werdecker | C03C 17/02 427/379 |
| 2014/0072811 | A1 | 3/2014 | Watanabe et al. | |
| 2015/0132511 | A1* | 5/2015 | Scheich | B28B 1/26 428/34.4 |
| 2015/0143848 | A1* | 5/2015 | Schenk | C03C 17/04 65/33.4 |
| 2015/0197688 | A1* | 7/2015 | Such | C01B 33/18 252/301.4 F |
| 2018/0105452 | A1* | 4/2018 | Annamalai | C03C 10/0009 |

FOREIGN PATENT DOCUMENTS

| | | |
|---|---|---|
| DE | 102004054392 A1 | 3/2006 |
| DE | 102005059291 A1 | 6/2007 |
| DE | 102007030698 A1 | 1/2009 |
| DE | 102012012524 B3 | 7/2013 |
| EP | 1042241 A1 | 10/2000 |
| EP | 2048121 A1 | 4/2009 |
| JP | H0320211 A | 9/1991 |
| JP | H03202112 A | 9/1991 |
| JP | H03202116 A | 9/1991 |
| WO | 2015/067688 A1 | 5/2015 |

* cited by examiner

METHOD FOR PRODUCING A COMPOSITE BODY OF A MATERIAL WITH A HIGH SILICIC ACID CONTENT

BACKGROUND OF THE INVENTION

Quartz glass is distinguished by a low coefficient of thermal expansion, by optical transparency over a wide wavelength range, and by high chemical and thermal resistance. The term "quartz glass" refers to doped or undoped quartz glass with a high silicic acid content, namely, a $SiO_2$ content of at least 85%

To achieve special properties, quartz glass is doped with other substances, such as titanium, aluminum, boron or germanium. These substances are added in very small amounts and act as foreign atoms in the glass structure without forming a second phase in addition to the matrix.

A quartz glass which contains an additional component is here designated as "black glass," wherein a second phase of carbon, silicon, silicon carbide, silicon nitride, titanium nitride or titanium carbide is intercalated in a matrix of quartz glass and consolidated into a composite material. The fine-particle regions of the intercalated phase (e.g., Si phase or carbon phase) act as optical defects and have the effect that the composite material has a black or gray visual appearance at room temperature. On the other hand, the defects also have impacts on the heat absorption or heat emission of the composite material on the whole. Thermal radiation between 2 µm and 8 µm, i.e., in the wavelength range of the infrared radiation, is strongly absorbed. The high absorption and emission capacity for thermal radiation reduces the reflection thereof on the surfaces of the composite material. Local, non-reproducible heating up by reflected thermal radiation is thereby prevented and a uniform temperature distribution is achieved in the environment of the composite material. The high degree of emission of the composite material makes the component particularly suitable for use in thermal treatments where a reproducible and homogeneous temperature distribution is of importance.

Frequently, there is a need to connect quartz glass elements to one another, for example for the manufacture of quartz glass components having a complex shape. Commonly, this connection is provided by welding the components to one another. For example, EP 1 042 241 B1 describes a method for the butt-like welding of quartz glass tubes. Welding comprises melting the surfaces to be connected to one another and pressing the softened surfaces against one another, which may easily lead to undesired plastic deformation in the area of the welding zone. Though it is possible to remove deformations of this kind by extensive after-treatment, some dimensional deviations usually remain.

Further difficulties arise during the welding of black glass. During heating, the temperature is possibly limited to values below the melting point of the intercalated phase (Si phase: 1410° C.). In the case of intercalated carbon, the limiting factor is that carbon detaches from the free surface due to strong heating or it oxidizes or burns off due to the high process temperatures; this may lead to the formation of bubbles. Moreover, due to the above-mentioned high emission degree of the black glass, most of the heat that has been introduced by a welding torch is emitted again, so that the material is shining in a brightly glowing manner and rapidly cools down again, as compared with transparent or opaque quartz glass. A bonding or shaping of black glass is therefore not possible by way of hot working. It is known from EP 2 048 121 A1 that a component of black glass is provided on all sides of the surface with a layer of transparent quartz glass. Thanks to the layer, it is possible to process the component of black glass in hot processes, specifically to weld it to another quartz glass component. The transparent outer layer is generated by subjecting a porous $SiO_2$ soot body to a gas phase reaction with organic silicon compounds, followed by vitrification under vacuum. The carbon component of the organic Si compound cannot diffuse out of the core region of the soot body during vitrification, resulting in a component of black glass with a carbon phase in the core region (carbon content 30 wt. ppm to 50,000 wt. ppm) and with a carbon-free (less than 30 wt. ppm carbon) transparent outer layer. The outer layer has a layer thickness in the range of one millimeter to 10 millimeters, the layer thickness depending on the negative pressure set during vitrification of the component. The setting of the layer thickness and the adjustment of the carbon amount in the core region of the component turn out to be complex, so that the method according to EP 2 048 121 A1 must be considered to be complicated on the whole. Moreover, this will yield only a component of black glass that is provided on all sides with a transparent outer layer; the selective formation of only one connecting surface is not possible.

A component of black glass with a transparent outer layer is also disclosed in US 2014/0072811 A1. A plate of black glass is here brought into contact with an $SiO_2$-containing slurry mass after sintering at 1500° C. so that the plate is provided on all sides with a thin slurry layer. This is followed by temperature treatments at 1000° C. and 1600° C., respectively, resulting in a densely sintered plate of black glass with a transparent, bubble-free outer layer having a thickness of 0.1 mm. Since an already sintered plate is used, the adhesion of the slurry mass to the surface is relatively poor, so that one obtains only a thin slurry layer and, as a result thereof, also only a 0.1 ram thin, transparent outer layer. Such a thin outer layer is not sufficient for subsequent bonding by welding because, as has been explained above, the heat of a welding torch immediately penetrates the outer layer and acts on the black glass positioned thereunder, it is there emitted again, and the component thus cools down all in all too rapidly to allow bonding with another material having a high silicic acid content.

Furthermore, DE 10 2004 054 392 A1 discloses a method for connecting components consisting of a material with a high silicic acid content, in which method a pourable or pasty slurry mass which contains amorphous $SiO_2$ particles is applied to individual connecting surfaces of densely sintered quartz glass components. Immediately thereafter, the connecting surfaces are fixed with respect to or onto each other. The bonding mass that is more or less enclosed between the two connecting surfaces is then dried. A correspondingly slow drying process yields a dried layer without cracks that is suited for connecting relatively small plates. This method is no longer suited for large-area connections with a correspondingly high pressing pressure already due to the dead weight of the quartz glass parts to be connected, or it would require long and uneconomic drying times to remove the dispersing agent of the bonding mass from the bonding site without any defects.

BRIEF SUMMARY OF THE INVENTION

It is thus the object of the present invention to provide a method that permits an inexpensive manufacture of a mechanically and thermally stable composite body of a material with a high silicic acid content. Specifically, it is the aim to provide large-area bonding connections by way of welding.

The present invention thus relates to a method for producing a composite body containing a first layer of a material having a high silicic acid content and an additional component in a first concentration connected to a second layer of a material having a high silicic acid content and an additional component in a second concentration that differs from the first concentration, wherein the first and the second concentrations are greater than or equal to zero.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
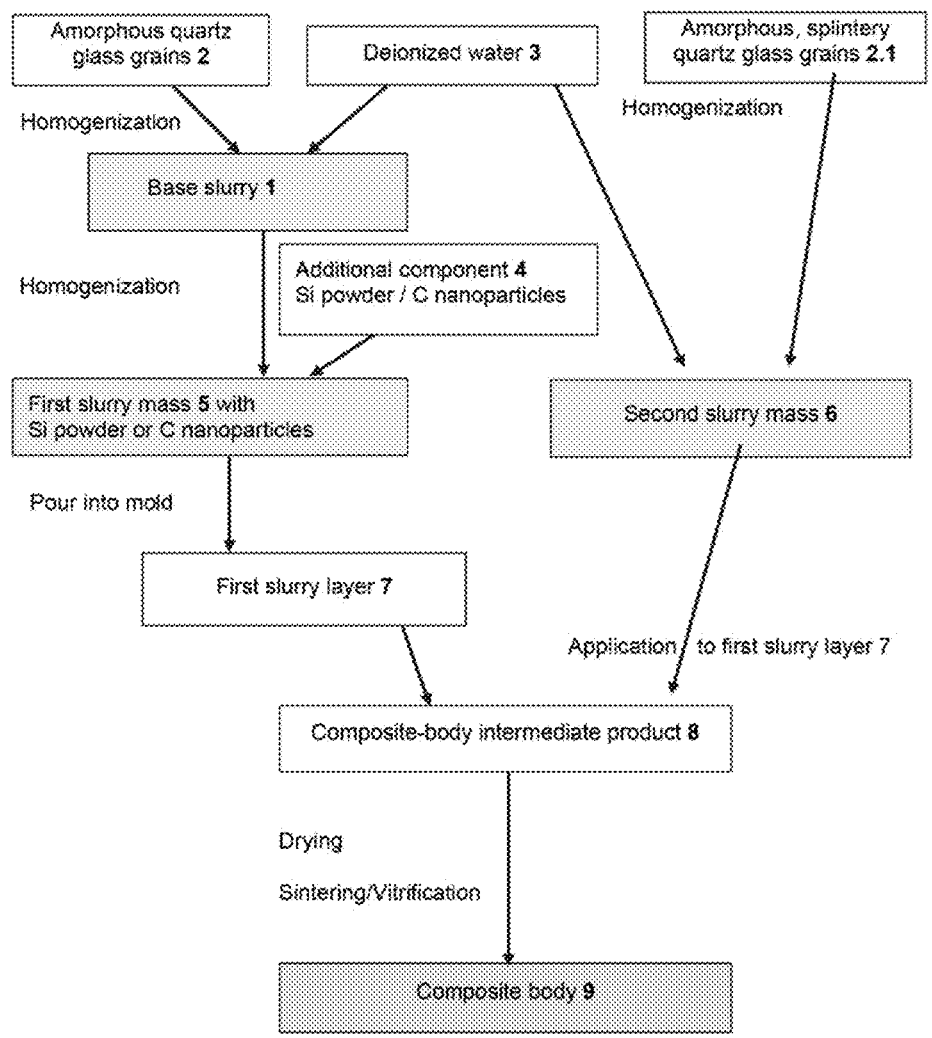
FIG. 1 is a flow diagram for explaining the method according to the invention.

The object of the invention is achieved by the method according to the invention comprising the following steps:
  (a) preparing a first slurry layer having a free surface from a first slurry mass containing first $SiO_2$ particles and an additional component in a first concentration dispersed in a first dispersing agent,
  (b) providing a second slurry mass containing second $SiO_2$ particles and an additional component in a second concentration that differs from the first concentration dispersed in a second dispersing agent,
  (c) forming a composite-body intermediate product by applying the second slurry mass to the free surface of the first slurry layer, and
  (d) heating the composite-body intermediate product while forming the composite body.

In the method according to the invention, the manufacture of the composite body from materials having high silicic acid content is based on the measures that after providing a first slurry layer of a $SiO_2$-containing slurry mass, a second $SiO_2$-containing slurry mass is applied to the first layer and the two slurry layers are jointly sintered or vitrified. A material with a high silicic acid content may be understood to be doped or undated quartz glass with a $SiO_2$ content of at least 85%. This material will also briefly be called "quartz glass" in the following.

The first slurry layer may be understood within the meaning of the method according to the invention to be an intermediate product for a base body layer or for a functional layer of the composite body.

The preparation of a first slurry layer having a free surface is carried out by using a first $SiO_2$ slurry mass that, when poured out, inherently forms a smooth free surface. The dispersing agent of the slurry mass is still substantially present in this slurry layer, so that the first slurry layer does not here correspond to a porous green body mass, as is normally created during drying of at least a part of the dispersing agent of a slurry mass. The surface of the slurry layer forms a planar boundary or connecting surface to which the second slurry mass can be subsequently applied without the two slurry masses being intermixed. The composite-body intermediate product is thus created by two mutually contacting layers of $SiO_2$-containing slurry masses that differ only slightly in their moisture contents (proportion of dispersing agent) or solids contents. The dispersing agent acts here on the boundary surface as a kind of "binding phase" between the first slurry layer and the second $SiO_2$ slurry mass. This procedure has the advantage that the two slurry masses show a similar shrinkage behavior during subsequent heating.

Heating comprises expelling the dispersing agent out of the two slurry masses and a sintering or vitrifying phase, whereby a multilayered composite body of a material with a high silicic acid content is obtained as a solid component. The composite body comprises a first layer of a material with a high silicic acid content and an additional component in a first concentration that is connected to a second layer of a material with a high silicic acid content and an additional component in a second concentration that differs from the first concentration. The second layer is able, due to its share of the additional component, to form a connecting surface with a further component of a material with a high silicic acid content. The composite body is created in a single hot process, whereby the method according to the invention allows an inexpensive production.

By contrast, additional hot processes, such as the subsequent welding of two already sintered components or the vitrification of a slurry mass on a densely sintered or pre-sintered basic body, are required in the methods according to the prior art.

A dispersion or suspension of $SiO_2$ particles in a liquid, e.g., water, alcohol, or a mixture of these substances, is called an $SiO_2$-containing slurry mass. The proportion of $SiO_2$ particles may be the same in both slurry masses or may differ by up to 5% by wt.

Each of the first and second $SiO_2$-containing slurry masses contains additional components that may be the same or may be different in their type. The concentration of the additional component in the second slurry mass differs from the concentration in the first slurry mass, wherein the first and the second concentrations are greater than or equal to zero. This means that the concentration of the additional component in one of the two slurry masses may also be zero.

Doping in the sense of the introduction of foreign atoms into a $SiO_2$ matrix is here not regarded as an additional component. Rather, an addition of substances in amounts suited to macroscopically form a second phase, besides the $SiO_2$ matrix, which leads to targeted changes in physical and chemical properties of the component produced thereby, is understood as the additional component.

The solids content of the two $SiO_2$-containing slurry masses is substantially determined by the proportion of $SiO_2$ particles. In addition, the additional component accounts for a further proportion of the solid. The $SiO_2$ proportion in the solid is at least 85% by wt. to obtain a mechanically and thermally stable composite body of a material with a high silicic acid content.

In a preferred procedure, the first and the second $SiO_2$-containing slurry masses differ in their solids content from each other by not more than 5% by wt. In the case of great differences in the solids contents of the two $SiO_2$ slurry masses, great differences in the shrinkage of the two masses may arise during the joint heating and sintering, and these may lead to cracks and other defects in the composite body.

It has turned out to be useful that each of the $SiO_2$-containing slurry masses has a solids content of at least 65% by wt., preferably at least 75% by wt. In slurry masses with solids contents of this type, the shrinkage caused by drying and sintering is relatively small, which reduces the risks arising during manufacture and contributes to an inexpensive production. Moreover, this improves the form stability and dimensional accuracy of the composite body.

Advantageously, the preparation of the first slurry layer according to method step (a) and the formation of the composite-body intermediate product according to method step (c) are carried out by using an absorbent mold into which the first $SiO_2$ slurry mass and the second $SiO_2$ slurry mass are introduced one after the other. The dispersing agent contained in the slurry masses is absorbed by the absorptive mold, at least in part, and accelerates the process for forming the composite body. The mold is here configured such that after introduction of the first slurry mass, the mass forms a slurry layer with a large-area free surface in the mold and the second slurry mass is applied thereto. The use of an absorbent mold, as is e.g., common as a plaster mold in the slip casting method, facilitates the production of a composite body close to the final contour. The absorbent mold in the method according to the invention, however, may also comprise sub-areas of a non-absorbent material, whereby the body formation into a specific spatial direction can be influenced in a targeted manner.

To minimize a mixing risk during over-coating of the first slurry layer with the second slurry mass, it has turned out to be useful when the preparation of the first slurry layer according to method step (a) comprises a settling phase of at least 30 minutes, after which a supernatant of first slurry mass is removed from the surface of the first slurry layer. In the preparation of the first slurry layer, settling or consolidation of the first slurry mass by slow removal of the dispersing agent takes place in a time-dependent manner, resulting in a first slurry layer over which there is still a supernatant of the first slurry mass. This supernatant is e.g., removed by suction, and there remains the free surface of the first slurry layer that has been subjected to stabilization by way of the settling or consolidation phase. This avoids penetration of the surface of the first slurry layer by the pouring stream in the subsequent application of the second slurry mass. The first slurry layer is also called a green body mass or body.

It has further turned out to be useful to carry out the application of the second $SiO_2$-containing slurry mass by a pouring stream guided at an angle in the range of 3° to 15° relative to the free surface of the first slurry layer. Moreover, the pouring stream advantageously has an elongated shape in horizontal cross-section. These two measures have the effect that the forces acting on the free surface of the first slurry layer by way of the pouring stream of the second $SiO_2$-containing slurry mass are reduced, so that a substantially flat, horizontal surface is maintained and the pouring stream does not penetrate into the slurry layer formed by the first slurry mass. A rectangular shape with rounded corners is here regarded as an elongated shape. The angle adjustment upon supply of the second $SiO_2$-containing slurry mass and the elongated form of the cross section of the pouring stream can be achieved with the help of a pouring channel that has a width which is adapted to the surface expansion of the first slurry layer and is at least 50 mm.

The two $SiO_2$-containing slurry masses preferably contain amorphous particles with particle sizes in the range of 1 μm to 50 μm which are present in a splintery and/or spherical form. Particularly preferred are splintery $SiO_2$ particles in this particle size range and with a wide size distribution for the reason that a good interlock with one another and an advantageous sintering behavior, together with a comparatively low shrinkage, can thereby be achieved. Moreover, it has been found that in such $SiO_2$-containing slurry masses, a high green strength of the composite-body intermediate product is also obtained.

In a preferred embodiment of the method according to the invention, silicon particles and/or carbon particles are contained as an additional component in the $SiO_2$-containing slurry mass. This leads to the formation of at least one layer of the composite body to be finished from a material with a high silicic acid content and high heat absorption and heat emission. The $SiO_2$-containing slurry mass that contains silicon and/or carbon particles as an additional component forms a layer of the composite body in the form of a composite material that has a matrix which may be opaque, but is preferably translucent or transparent. Portions of a phase which contains silicon (Si) in elemental form and is here called "Si phase" or contains carbon particles are intercalated into the matrix with a distribution that is as fine as possible. The fines portions of the intercalated phase act as optical defects in die matrix on the one hand and have the effect that the composite material has a black or gray-blackish visual appearance at room temperature, depending on the thickness, so that this layer is called "black glass." As has already been explained above, the defects also have impacts on the heat absorption or heat emission of the composite material on the whole. Thermal radiation between 2 μm and 8 μm, i.e., in the wavelength range of infrared radiation, is strongly absorbed. Thus, a bonding of such a material by standard welding methods is not possible or is only possible to an inadequate degree.

The heat absorption of the composite material depends on the portion of the Si phase or on the portion of the carbon phase. The greater their portion, the higher are absorption capacity and emission capacity. The weight proportion of the Si phase is preferably at least 0.1% by wt. On the other hand, a particularly high volume fraction of the Si phase may aggravate the production of the composite material. In view of this, the weight proportion of the Si phase is preferably not more than 5%.

This also applies by analogy to the carbon phase. Its share in the solids content of the first or the second $SiO_2$-containing slurry mass is preferably in the range of 0.01% by wt. to 3% by wt.

As regards the heating of the composite-body intermediate product for the formation of the composite body, it has turned out to be advantageous when this takes place at a temperature of not more than 1,400° C. This maximum temperature is particularly of importance when one of the $SiO_2$ slurry masses to be processed contains a Si phase because a situation must be avoided where the Si phase fuses. The composite-body intermediate product is kept at the sintering temperature for a period of at least 2 hours.

The method according to the invention allows for the production of a mechanically and thermally stable composite body with two layers that conform to a base body layer connected to a functional layer. Such a base body layer of a material having a high silicic acid content contains an additional component of silicon and/or carbon particles, whereas the second layer can be designated as a functional layer of a material of a high silicic acid content without such an additional component. This functional layer allows hot working, for instance by using a welding torch.

The method according to the invention will now be explained by way of example with reference to the production of a carrier of quartz glass for a reactor for the treatment of a wafer with reference to FIGS. 1 and 2.

Example 1

Preparation of a First $SiO_2$ Slurry Mass with Additional Component

For a batch of 10 kg of the first slurry mass (base slurry) 1, 8.2 kg of amorphous quartz glass grains 2, which were obtained by melting natural quartz raw material and having grain sizes in the range between 250 µm and 650 µm, were mixed with 1.8 kg, deionized water 3 with a conductivity of less than 3 µS in a drum mill which was lined with quartz glass and had a volume of about 20 liters. The quartz glass grains 2 were previously purified by a hot chlorination method; attention was paid that the cristobalite content was below 1% by wt.

This mixture was milled with grinding balls of quartz glass on a roller block at 23 rpm for a period of 3 days to such an extent that a homogeneous, first base slurry 1 with a solids content of 82% was formed. The $SiO_2$ particles of the quartz glass grains 2 milled in this way had a splintery grain form. During the grinding process, the pH was lowered to about 4 due to the dissolving $SiO_2$.

Subsequently, the grinding balls were removed from the base slurry 1 obtained in this way, and an additional component in the form of silicon powder 4 with a metallic purity of 99.99% was admixed in an amount until a solids content of 83% by wt. was obtained.

The silicon powder 4 consisted of substantially non-spherical powder particles with a narrow particle size distribution: the $D_{97}$ value was about 10 µm and the fines content with particle sizes of less than 2 µm was previously removed. The silicon powder 4 was uniformly distributed by continued mixing in the base slurry 1.

The first slurry mass 5 filled with the silicon powder 4 was homogenized for another 12 hours. The homogeneous first slurry mass 5 obtained thereby had a solids content of 83%. The weight percentage of the silicon powder as an additional component in the total solids content was 2% and the volume fraction was also nearly 2% because of the similar specific densities of $SiO_2$ and Si. The $SiO_2$ particles 2 in the finished homogenized slurry mass 5 had a splintery form and showed a particle size distribution that was distinguished by a $D_{50}$ value of about 8 µm and by a $D_{90}$ value of about 40 µm.

Preparation of a Second $SiO_2$ Slurry Mass without Additional Component

A second $SiO_2$ slurry mass 6 was prepared to generate the functional layer of the composite body 8 and was without an additional component. The $SiO_2$ base slurry specified above in more detail was here used as the second $SiO_2$ slurry mass 6.

Preparation of a Plate-Shaped Composite Body

The first slurry mass 5 with the additional component of silicon particles 4 was poured into a trough-shaped plaster mold where it formed the first slurry layer 7 with a free surface of the poured-in first slurry mass 5. The first slurry layer 7 formed a base body layer 10 of the composite body 9. The first slurry mass 5 occupied about ⅔ of the possible filling height of the plaster mold. The cavity mold provided a plate geometry with the green dimensions of 500 mm×500 mm.

Without any substantial time delay, the second slurry mass 6, which, besides the $SiO_2$ particles 2.1 was without any additional component, was subsequently slowly applied to the free surface of the first slurry layer 7. When the second $SiO_2$ slurry mass 6 was poured out, the pouring stream was guided by use of a pouring channel such that it was applied at an angle of 5°, based on the surface of the first slurry layer 7, to this layer. The pouring channel had a width of 450 mm adapted to the plate geometry and was guided at a minimal distance from the first slurry layer 7 in the range of about one millimeter to 5 mm over this layer. Viewed in the horizontal cross section, the pouring stream produced thereby had the form of a rounded rectangle with the dimensions 450×5 $mm^2$. It was thereby ensured that the pouring stream of the second $SiO_2$ slurry mass 6 did not penetrate the substantially flat surface of the first slurry layer 7, which was formed by the first $SiO_2$ slurry mass 5, as the boundary. The second $SiO_2$ slurry mass 6 occupied about half the remaining filling height of the plaster mold and formed a uniform closed slurry layer with a thickness of about 30 mm.

It is also possible to first pour the $SiO_2$ slurry mass 6 without additional component into the casting mold and then to apply the $SiO_2$ slurry mass 6 with additional component thereto.

The first slurry layer 7 and the second $SiO_2$ slurry mass 6 applied thereto jointly formed the composite-body intermediate product 8 that, after mold casting and removal from the plaster mold, was subjected to drying to form a green body. The plaster mold absorbed the dispersing agent up to a residual moisture of about 8%. The composite-body intermediate product 8 was then dried in a ventilated furnace at about 90° C. for five days. This was followed by sintering or vitrification in a sintering furnace in air, wherein the composite-body intermediate product 8 was heated to a heating temperature of 1390° C. within one hour and kept at this temperature for 5 h. Cooling was carried out with a cooling ramp of to a furnace temperature of 1000° C. and then unregulated in the closed furnace.

Figure 2:
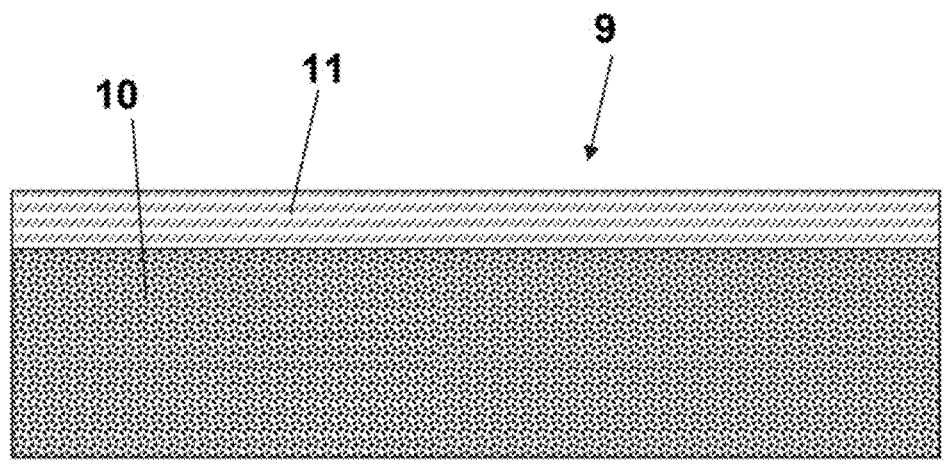
FIG. 2 is a sectional view of a composite body produced according to the method according to the invention.

The composite body 9 obtained thereby is shown in the sectional view of FIG. 1 it comprises a base body layer 10 of a material with a high silicic acid content with 2 vol. % additional component of Si phase and a functional layer 11 of pure quartz glass formed from the $SiO_2$ slurry mass 6. The composite body 9 is a plate with the following final dimensions: 450×450×54 mm.

In a matrix of opaque quartz glass, the base body layer 10 of the composite body 9 shows non-spherical portions which are separated from one another, consist of semi-metallic Si phase, and are homogeneously distributed, and the size and morphology of which largely correspond to those of the Si powder used. The maximal dimensions of the Si phase portions are on average (median value) in the range of about 1 to 10 µm. The intercalated Si phase leads to the black coloration of the base body layer 10 and has the effect that this layer shows a high absorption of thermal radiation at a high temperature. The latter means that a bonding of the layer with intercalated Si phase by way of hot treatment is not possible because heat introduced by a welding torch is emitted again, so that the material is shining in a brightly glowing manner and will rapidly cool down again in comparison with transparent or opaque quartz glass. This flaw is compensated by the functional layer 11 of the composite body 9 that is arranged on a side surface with a thickness of 20 mm. It consists of opaque quartz glass and has a closed fine porosity of about 5 vol. % with a pore size of <20 µm. This area of the composite body 9 can now be used for bonding by heat treatment.

Example 2

For the production of a composite body according to the invention from a first slurry mass 5 containing silicon as the additional component and from a second slurry mass 6 without additional component, two slurry masses are used that, except for the solids content, conform to the first and the second slurry mass of Example 1. The solids content of the two slurry masses is here however about 80% by wt. each time.

The first slurry mass 5 with Si as the additional component was filled into a casting mold for producing a square plate that only comprised an absorbent bottom, but the walls of which consisted of non-absorbent material. The casting height was 4 cm. A body which corresponds to the first slurry layer 7 was progressively built up from the bottom to the top in the casting mold due to the absorbent bottom surface. After a waiting period of 3 hours, the desired body height of about 3 cm was obtained, but a layer with a thickness of 5 to 10 mm, which consisted of a still liquid slurry mass, remained on the surface. This residual slurry mass was sucked off with a pump and/or by dabbing with an absorbent soft material, so that a body having a solids content of about 89% by wt. was obtained from the first slurry mass, onto which the second $SiO_2$ slurry mass 6 (without additional component) was then cast. The casting height of the second slurry mass 6 was 10 cm. The body from the first slurry layer 7 and the second slurry mass 6 applied thereto jointly formed the composite-body intermediate product 8 which, as described in Example 1, was dried and sintered and thereby formed the composite body 9.

Example 3

In this case, the first slurry mass 5 contained carbon as the additional component 4. For a batch of 10 kg of the first slurry mass 5, 8.2 kg of amorphous quartz glass grains 2, which were obtained by melting natural quartz raw material, were mixed with 1.8 kg deionized water 3 with a conductivity of less than 3 μS in a drum mill which was lined with quartz glass and had a volume of about 20 liters. The quartz glass grains 2 were previously purified by a hot chlorination method; attention was paid that the cristobalite content was below 1% by wt. The quartz glass grains 2 had a mean particle size below 70 μm.

This mixture was milled with grinding balls of quartz glass on a roller block at 23 rpm for a period of 3 days to such an extent that a homogeneous, first base slurry 1 with a solids content of 80% was formed. During the grinding process, the pH was lowered to about 4.5 due to the dissolving $SiO_2$.

Subsequently, the grinding balls were removed from the base slurry 1 obtained thereby, and carbon nanoparticles, such as carbon black, were admixed as additional component 4 in an amount of 1.2% by wt. The solids content of the first $SiO_2$ slurry mass 5 obtained thereby was then about 81% by wt.

In the preparation of the second $SiO_2$ slurry mass 6, spherical $SiO_2$ particles 2.1 were used that are distinguished by a multimodal particle size distribution with a relatively narrow maximum of the size distribution at about 15 μm ($D_{50}$ value). A secondary maximum was in the range of about 2 μm. These $SiO_2$ particles with a $D_{50}$ value at 15 μm will be called $R_{15}$ in the following. Moreover, further $SiO_2$ grains were used that have $D_{50}$ values at 5 μm and 30 μm. These grains are called $R_5$ and $R_{30}$, respectively, depending on their $D_{50}$ value.

These $SiO_2$ grains were purified by a hot chlorination process in advance. The impurity content of the purified grains was low and was less than 1 wt. ppm on the whole. Especially, the content of $Si_2O$ was less than 10 wt. ppb.

The following formulations have turned out to be useful:

| Formulation 1 | |
|---|---|
| $R_{30}$ | 250 g |
| $R_{15}$ | 500 g |
| $R_5$ | 200 g |

These components are dispersed in water, resulting in a solids content of 86% by wt.

| Formulation 2 | |
|---|---|
| $R_{15}$ | 400 g |
| $R_5$ | 90 g |

Fumed silica: 10 g with BET surface area of 200 $m^2/g$.

These components were dispersed in the case of formulation 2 in pure ethanol, resulting in a solids content of 84% by wt.

The highly filled second slurry masses 6 produced in this way show a thixotropic behavior. They can be cast and spread and are therefore well suited for the processing technique according to the invention.

The manufacture of a plate-shaped composite body from the first slurry mass 5 with carbon nanoparticles as the additional component and the second slurry mass 6 with $SiO_2$ grains according to Formulation 1 or 2 was carried Out according to the process sequence and by use of the same plaster mold geometry as in Example 1.

In this case, the base body layer 10 of the composite body 9 showed carbon particles which are homogeneously distributed in a matrix of opaque quartz glass, which led to the black coloration of the base body layer 10 and have the effect that a high absorption of thermal radiation at a high temperature was shown. The latter means that a bonding of the layer with intercalated C phase is not possible by hot working because heat introduced by a welding torch is emitted again so that the material is shining in a brightly glowing manner and rapidly cools down again in comparison with transparent or opaque quartz glass. This flaw is compensated by the factional layer 11 of the composite body 9 which is arranged on a side surface with a thickness of 10 mm and consists of opaque quartz glass. This area of the composite body 9 can now be used for bonding by hot working.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for producing a composite body comprising a first layer of a material having a high silicic acid content and a first additional component in a first concentration connected to a second layer of a material having a high silicic acid content and a second additional component in a second concentration that differs from the first concentration, wherein the first and the second concentrations are greater than or equal to zero, the method comprising the following steps:
    (a) preparing a first slurry layer having a free surface from a first slurry mass containing first $SiO_2$ particles and the first additional component in the first concentration dispersed in a first dispersing agent, (b) providing a second slurry mass containing second SiO$_2$ particles and the second additional component in a second concentration that differs from the first concentration dispersed in a second dispersing agent, (c) forming a composite-body intermediate product by applying the second slurry mass to the free surface of the first slurry layer, and (d) heating the composite-body intermediate product while forming the composite body.

2. The method according to claim 1, wherein each of the first and the second SiO$_2$-containing slurry masses has a solids content of at least 65% by wt.

3. The method according to claim 1, wherein the solids contents of the first and the second SiO$_2$-containing slurry masses differ by not more than 5% by wt.

4. The method according to claim 1, wherein the preparation of the first slurry layer according to step (a) and the formation of the composite-body intermediate product according to step (c) are carried out by introducing the first and the second SiO$_2$ slurry masses into an absorbent mold one after the other.

5. The method according to claim 1, wherein the preparation of the first slurry layer according to step (a) comprises a settling phase of at least 30 minutes, followed by removing a supernatant of the first slurry mass from the surface of the first slurry layer.

6. The method according to claim 1, wherein the second SiO$_2$-containing slurry mass is applied by a pouring stream guided at an angle in a range of 3° to 15° relative to the free surface of the first slurry layer.

7. The method according to claim 6, wherein the pouring stream has an elongated shape in a horizontal cross-section.

8. The method according to claim 1, wherein the first and the second SiO$_2$-containing slurry masses contain amorphous SiO$_2$ particles in a splintery and/or spherical form with particle sizes in a range of 1 µm to 50 µm.

9. The method according to claim 1, wherein at least one of the first and the second additional components contains silicon particles and/or carbon particles.

10. The method according to claim 9, wherein the silicon particles are contained with a solids content in a range of 0.1% by wt. to 5% by wt.

11. The method according to claim 9 wherein the carbon particles are contained with a solids content in a range of 0.01 by wt. to 3% by wt.

12. The method according to claim 9, wherein the heating in step (d) is carried out at a temperature of not more than 1400° C. while forming the composite body.

13. The method according to claim 9, wherein at least one of the first and second SiO$_2$-containing slurry masses forms a base body layer of the composite body.

\* \* \* \* \*